US007882548B2

(12) United States Patent
Heath et al.

(10) Patent No.: US 7,882,548 B2
(45) Date of Patent: Feb. 1, 2011

(54) SYSTEM AND METHOD FOR PROTECTING IDENTITY INFORMATION

(75) Inventors: Pamela J. Heath, Seattle, WA (US); Jonathan C. Cluts, Sammamish, WA (US); Sven Pleyer, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1169 days.

(21) Appl. No.: 11/533,594

(22) Filed: Sep. 20, 2006

(65) Prior Publication Data

US 2007/0067832 A1   Mar. 22, 2007

Related U.S. Application Data

(63) Continuation of application No. 10/386,345, filed on Mar. 11, 2003, now Pat. No. 7,162,640.

(51) Int. Cl.
   H04L 29/00   (2006.01)
   G06F 21/00   (2006.01)
(52) U.S. Cl. ............................................. 726/5; 726/27
(58) Field of Classification Search ....................... None
   See application file for complete search history.

(56) References Cited

U.S. PATENT DOCUMENTS

| 5,604,800 | A |   | 2/1997 | Johnson et al. |
|---|---|---|---|---|
| 5,708,812 | A |   | 1/1998 | Van Dyke |
| 6,202,054 | B1 | * | 3/2001 | Lawlor et al. ................ 705/42 |
| 6,915,265 | B1 |   | 7/2005 | Johnson |
| 7,031,945 | B1 | * | 4/2006 | Donner ........................ 705/64 |
| 2001/0023415 | A1 |   | 9/2001 | Keil |
| 2001/0047281 | A1 | * | 11/2001 | Keresman et al. ........... 713/200 |
| 2001/0047335 | A1 | * | 11/2001 | Arndt et al. .................. 705/44 |
| 2001/0054155 | A1 |   | 12/2001 | Hagan et al. |
| 2002/0029342 | A1 | * | 3/2002 | Keech ......................... 713/184 |
| 2002/0073041 | A1 | * | 6/2002 | Kumhyr ....................... 705/64 |
| 2002/0112177 | A1 | * | 8/2002 | Voltmer et al. .............. 713/200 |

(Continued)

FOREIGN PATENT DOCUMENTS

WO   WO 02/073926 A   9/2002

OTHER PUBLICATIONS

R. Newbould et al., "Profiling—Technology", BT Technology Journal, 21(1), Jan. 2003.

Primary Examiner—Minh Dinh
Assistant Examiner—David Le
(74) Attorney, Agent, or Firm—Shook, Hardy & Bacon L.L.P.

(57) ABSTRACT

A method is provided for using an identity service for protecting identity information during an electronic transaction. The method includes registering an identity client, wherein the identity client possesses an associated multi-component identity. The method further includes regulating access to the multi-component identity such that the identity service authorizes dissemination of fewer than all components of the multi-component identity to an identity requester. Additionally, a method for providing client identity repair protect a client from fraudulent distribution of electronically available client identity information. Upon detection of fraudulent distribution of identity information, a new identity reference is created and attempts to access an old identity reference are tracked. If the attempts to access the old identity reference are authorized, the attempts are re-directed to the new identity reference. However, if the attempts were unauthorized, access to the new identity reference is denied.

34 Claims, 6 Drawing Sheets

U.S. PATENT DOCUMENTS

2002/0184217 A1  12/2002  Bisbee et al.
2002/0194128 A1  12/2002  Maritzen et al.
2003/0074564 A1   4/2003  Peterson
2003/0084288 A1   5/2003  de Jong et al.
2003/0115203 A1   6/2003  Brown et al.
2004/0138905 A1*  7/2004  Stinson et al. ................. 705/1

* cited by examiner

SYSTEM AND METHOD FOR PROTECTING IDENTITY INFORMATION

CROSS-REFERENCE TO RELATED APPLICATION

This application is a continuation of application Ser. No. 10/386,345, filed Mar. 11, 2003, now U.S. Pat. No. 7,162,640 issued Jan. 9, 2007, the disclosure of which is hereby incorporated herein by reference in its entirety.

STATEMENT REGARDING FEDERALLY SPONSORED RESEARCH OR DEVELOPMENT

Not applicable.

FIELD OF THE INVENTION

The present invention relates to the field of electronic transactions and more particularly to techniques for preventing unauthorized use of personal information transferred during the course of an electronic transaction.

BACKGROUND OF THE INVENTION

Consumers have become increasingly concerned about distributing personal information over the Internet, especially when the information requested is personally identifiable information (PII) which could be an attractive target for an identity thief. The ease of identity theft in the digital realm has generated concern among the public, including governments, industry, law enforcement and public interest organizations. Merchants, marketing firms, banks, and other institutions maintain large centralized databases that include names, addresses, credit card numbers and other personal information. These databases are potential targets for hackers. The vulnerability of this personal information discourages participation in Internet commerce.

Consumers may feel particularly vulnerable when engaging in an online transaction involving a plurality of entities. In this instance, the consumer is often required to provide personal information to all of the involved entities. Replicating distribution of the personal information increases the risk of identity theft.

Identity theft is generally more difficult to detect than other types of theft since an individual may not discover the theft for an extended period of time. Although an identity theft may not be immediately discovered, its effects can be devastating. Credit history and credit ratings can be ruined by identity theft. An individual using a stolen identity can create a criminal record. These records created by fraudulent use of an identity can be difficult to correct.

Aside from the creation of a fraudulent identity, other unauthorized uses of personal information may also discourage consumers from distributing this information over the Internet. For instance, merchants may share information for the purposes of targeting marketing activities. Consumers may receive unsolicited and unwanted marketing materials and unknown parties may have access to a consumer's merchandise preferences. This use of personal information may even discourage consumers from providing less intrusive information such as zip code, age and gender, which do not rise to the level of PII.

Current solutions to the identity theft problem involve keeping consumer information stored in large centralized databases private through hardware and software firewalls or encryption technologies. However if these technologies fail to keep unwanted parties out of the databases, all of the information will be exposed.

Increasing attention has been given to digital rights management (DRM) through which an individual is able to selectively confer rights to personal information. Another measure for restricting information distribution involves limiting the scope of distributed information such that personally identifiable information (PII) does not include enough information to enable identity theft.

Another measure that has been used to prevent identity theft is the issuance of a unique purchase number each time a credit cardholder makes an online purchase. This is sometimes referred to as a "single use" credit card number. Increasing attention has been given to digital rights management (DRM) through which an individual is able to selectively confer rights to personal information. Additionally, credit watch services are available to provide email alerts to consumers when a change to a credit report occurs or when a new account is opened.

The aforementioned solutions do not distribute identity information narrowly for online transactions and further do not provide an effective, overall approach to identity protection that operates both to prevent theft of personal information and to alert a consumer if such a theft occurs. Accordingly, there is a need for a solution which protects personal information used in electronic transactions using a distributed identity model. There is also a need for a comprehensive approach for protecting identity theft in online transactions which includes tracking the consumer's identity information and alerting the consumer to an identity theft.

SUMMARY OF THE INVENTION

In one aspect, the present invention is directed to a method for using an identity service for protecting identity information during an electronic transaction. The method includes registering an identity client having a multi-component identity. The method further includes regulating access to the multi-component identity such that the identity service authorizes dissemination of fewer than all components of the multi-component identity to an identity requester.

In a further aspect, an identity service is provided for protecting identity information during an electronic transaction. The identity service includes registration tools for registering identity clients and identity requesters. Each identity client is associated with a multi-component identity. The identity service also includes reference tools for creating a unique identity pointer to reference the multi-component identity of each identity client and access distribution logic for regulating access to the multi-component identity such that each registered identity requester is entitled to access fewer than all components of the multi-component identity.

In yet another aspect, the present invention is directed to a system for controlling distribution of client identity information during an electronic transaction. The system includes identity request processing tools for processing a request for client identity information from an identity requester and identity information distribution logic for determining a type of client identity information available to the identity information requester. The system further includes reference tools for referencing the type of available client identity information and identity information dissemination tools for providing the available type of identity information to the identity requester.

In an additional aspect, the present invention is directed to a method for controlling distribution of client identity information during an electronic transaction using an identity service. The method includes receiving an incoming request for client identity information from an identity requester and determining a subset of client identity information available to the identity requester. The method additionally includes referencing the available subset of client identity information and disseminating only the available subset of client identity information to the identity requester.

In yet a further aspect, the invention is directed to a method for providing client identity repair in order to protect a client from fraudulent distribution of electronically available client identity information. The method includes creating a new identity reference upon detection of fraudulent distribution of identity information and tracking attempts to access an old identity reference. The method further includes determining if the attempts to access the old identity reference are authorized and re-directing the attempts to the new identity reference if the attempts are authorized and denying access to the new identity reference if the attempts are not authorized.

BRIEF DESCRIPTION OF THE DRAWINGS

The present invention is described in detail below with reference to the attached drawing figures, wherein.

DETAILED DESCRIPTION OF THE INVENTION

Figure 1:
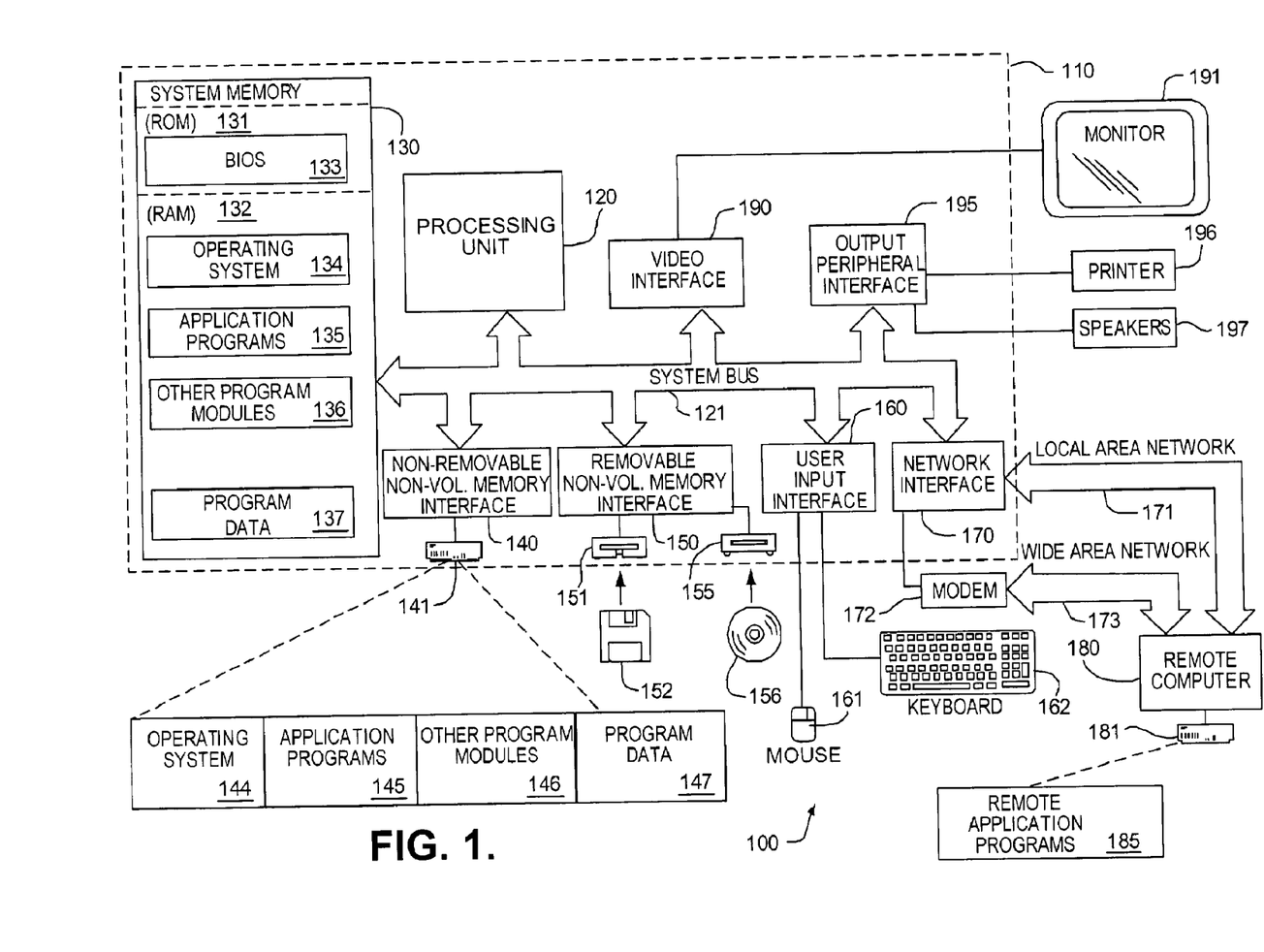
FIG. 1 is a block diagram of a suitable computing system environment for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
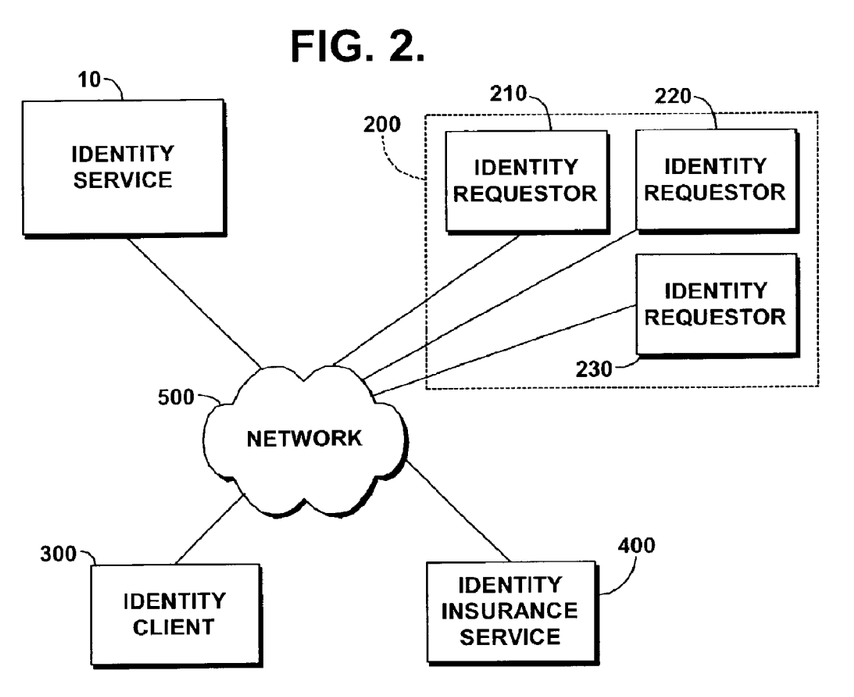
FIG. 2 is a block diagram showing a system of the invention.

FIG. 2 is a block diagram illustrating identity service participants in accordance with an embodiment of the invention. An identity service 10, an identity client 300, identity requesters 200, and identity insurance services 400 communicate over a network 500. The network 500 may be of any type described above with reference to FIG. 1.

Figure 3:
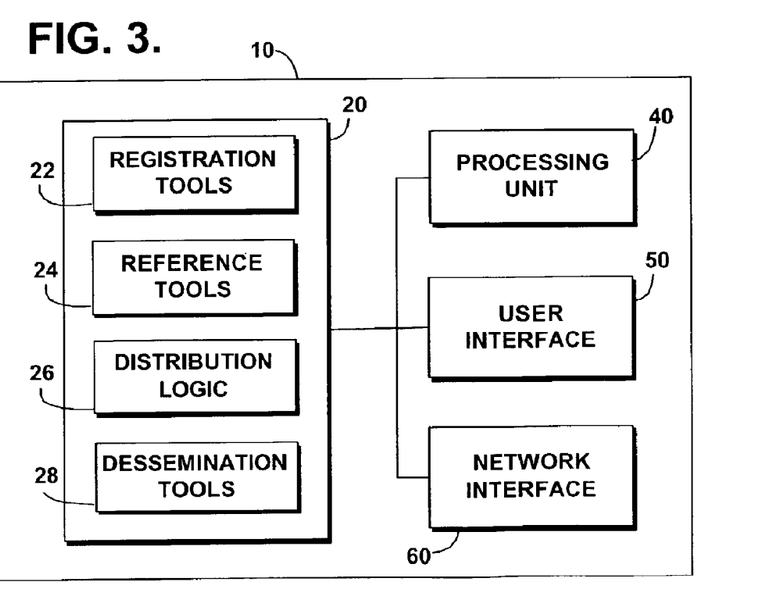
FIG. 3 is a block diagram illustrating an identity service in accordance with an embodiment of the invention.

FIG. 3 illustrates components of the identity service 10 in accordance with an embodiment of the invention. The identity service 10 may be implemented using any type of computer as described above with reference to FIG. 1. Regardless of the particular type of computerized device employed, the identity service 10 includes a memory 20, a processing unit 40, a user interface 50, and a network interface 60. Although it is likely that the identity service would include a plurality of memory storage devices, a generalized memory 20 is shown for simplification. The memory 20 stores registration tools 22, reference tools 24, distribution logic 26, and dissemination tools 28.

The registration tools 22 are implemented in order to register identity clients 300 and identity requesters 200 with the identity service 10. Identity clients 300 may be individuals or entities desiring to have their identity information protected by the identity service 10. The identity requesters 200 are generally entities that are involved in electronic transactions with the identity clients 300 and therefore need access to personal information concerning the identity clients 300 in order to complete the transaction.

The reference tools 24 create and control a reference to an identity client's personal information. The personal information typically includes items such as phone numbers, addresses, credit card information, bank account information, and a social security number for the identity client 300. The personal information may also include other types of information such as purchasing records and preferences or any other information that might be of value to anyone in electronic communication with the identity client 300. The reference tools 24 preferably create a pointer to the identity information. The identity service 10 is able to access the identity information of the identity client 300 through the use of this pointer. Using a pointer in this manner obviates the need to have a centralized database containing identity information for each identity client 300. Instead, the identity service stores only references to the identity information for each identity client 300.

The identity service 10 additionally includes distribution logic 26. the distribution logic 26 determines which portion of identity information should be distributed to an identity requester 200. Each identity requester 200 has a need for a limited amount of identity information as will be further explained below with reference to FIG. 4. In this manner, the identity service 10 will use its distribution logic 26 to limit the amount of identity information available to each participant, thereby concealing most components of identity information from the requesters 200 and decreasing the possibility of identity theft.

The identity service 10 also includes dissemination tools 28 for disseminating information as authorized by the distribution logic 26. The dissemination tools 28 distribute the authorized information during the course of an electronic transaction or as otherwise authorized by the identity client 300.

Figure 4:
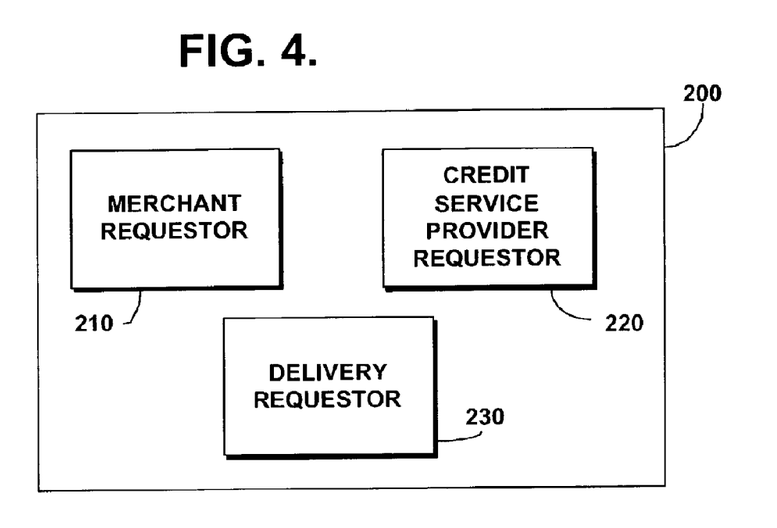
FIG. 4 is a block diagram illustrating identity requesters in accordance with an embodiment of the invention.

FIG. 4 is a block diagram showing exemplary identity requesters 200. Typically, identity requesters 200 may include a merchant requester 210, a credit service provider requester 220, and a delivery requester 230. The merchant requester 210 typically has been contacted by the identity client 300 in order to initiate an electronic transaction such as a purchase. The merchant requester 210 needs to know that the identity client 300 is capable of paying for the intended purchase. Accordingly the identity service 10 may consult a credit service provider requester 220 to determine whether the identity client 300 has sufficient funds to make the intended purpose. Of course the presence of the credit service provider requester 220 hinges on the selection of a payment method by the identity client 300. Alternatively, a bank may be called upon to verify that an identity client's bank account has sufficient funds to complete the purchase. The delivery requester 230 may be needed to deliver a purchased item to the address of the identity client 300. The delivery requester 230 also registers with the identity service 10 in order to gain access to the information needed from the identity client 300.

Although the identity requesters 200 are described above as including a merchant requester 210, a credit service provider requester 220, and a delivery requester 230, other types of identity requesters 200 seeking other types of information may also interact with the identity service 10. Identity requesters 200 may require age authentication in order to allow an identity client 300 to view requested information, to purchase alcoholic beverages or other items with a minimum age requirement, to receive a senior discount, or any other privileges associated with age. Identity requesters 200 may also include retailers that seek access to size information such as pants size, dress size, shirt size etc. Color and style preferences may also be available to an authorized requester. The identity service 10, upon confirming that an identity requester 200 is authorized, will locate this information using the above-described pointer and will provide the information to the requester 200.

Figure 5:
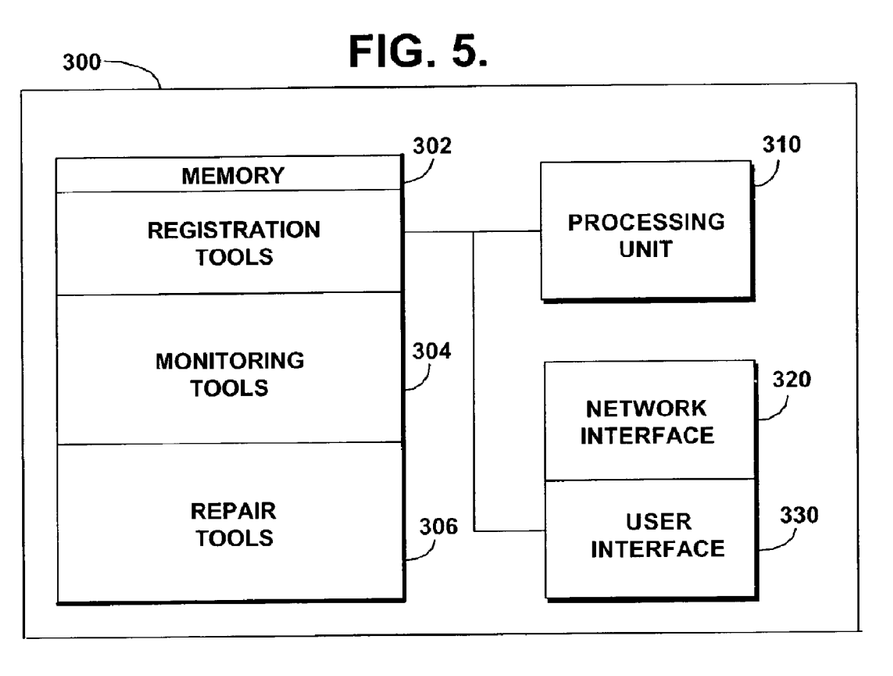
FIG. 5 is a block diagram illustrating an identity insurance service in accordance with an embodiment of the invention.

FIG. 5 illustrates an embodiment of the identity insurance service 400. If the identity client 300 registers with the identity insurance service 400, the identity insurance service 400 may agree to perform identity repair upon detection of fraudulently obtained identity information or upon request of the identity client 300. The identity insurance service 400 may include a processing unit 420, a network interface 430, and a user interface 440. The identity insurance service 400 may include a memory device 402 that stores registration tools 404, monitoring tools 406, and repair tools 408. An identity client 300 uses the registration tools 404 to register for the identity insurance service 400. Repair tools 408 would typically create a new reference to the identity information upon detection of fraudulently obtained identity information or undesired use of identity information. The monitoring tools 406 may monitor attempts to access the identity information through the old reference. The repair tools 408 would re-direct the authorized attempts to the new reference and deny access to unauthorized attempts.

Figure 6:
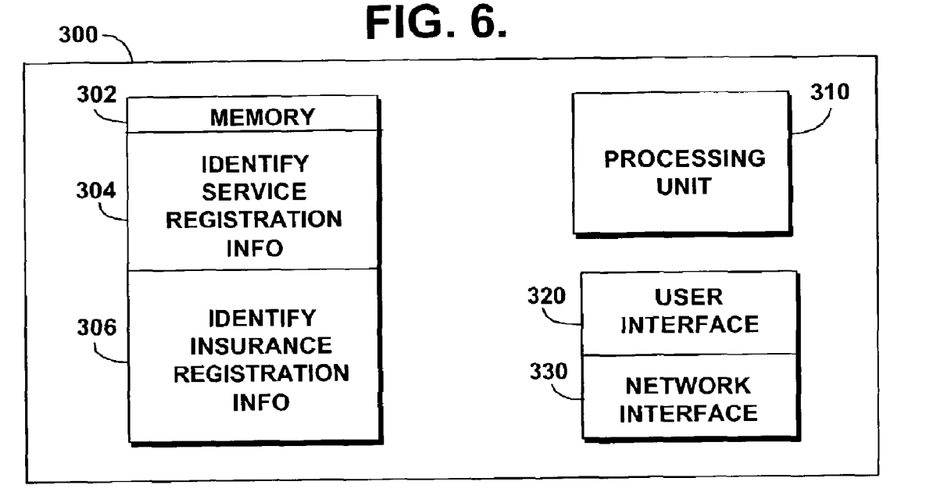
FIG. 6 is a block diagram illustrating an identity client in accordance with an embodiment of the invention.

FIG. 6 is a block diagram illustrating an embodiment of the identity client 300. The identity client 300 may include a memory 302 storing identity service registration information 304 and identity insurance registration information 306. This information should include all necessary information for the identity client 300 to access the identity service 10 and the identity insurance service 400. The identity client 300 additionally includes a processing unit 310, a user interface 320, and a network interface 330.

Figure 7:
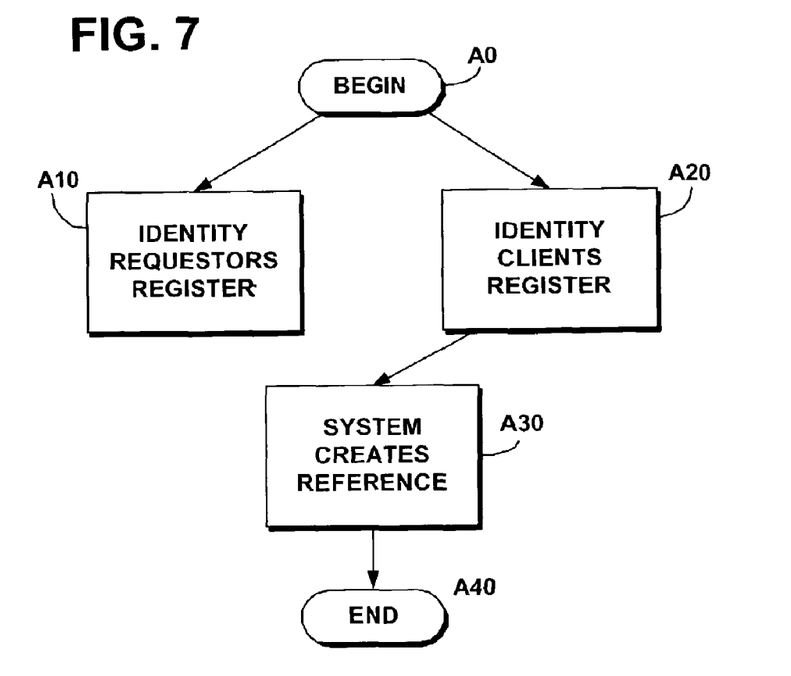
FIG. 7 is a flow chart showing the steps for setting up an identity service in accordance with an embodiment of the invention.

FIG. 7 is a flow chart illustrating initial set-up procedures for the identity service 10. The setup procedure begins in step A0, and the identity requesters 200 register with the identity service 10 in step A10. In step A20, the identity clients 300 register with the identity service 10. During registration, the identity client 300 provides all of the necessary information for the identity service 10 to create a reference to the identity clients' identity information. In step A30, the identity service 10 creates a reference such as a pointer to the identity information associated with the identity client 300 and the process ends in step A40. In a similar manner, the identity clients 300 and the identity requesters 200 may also register for the identity insurance service 400 when the service is available.

Figure 8:
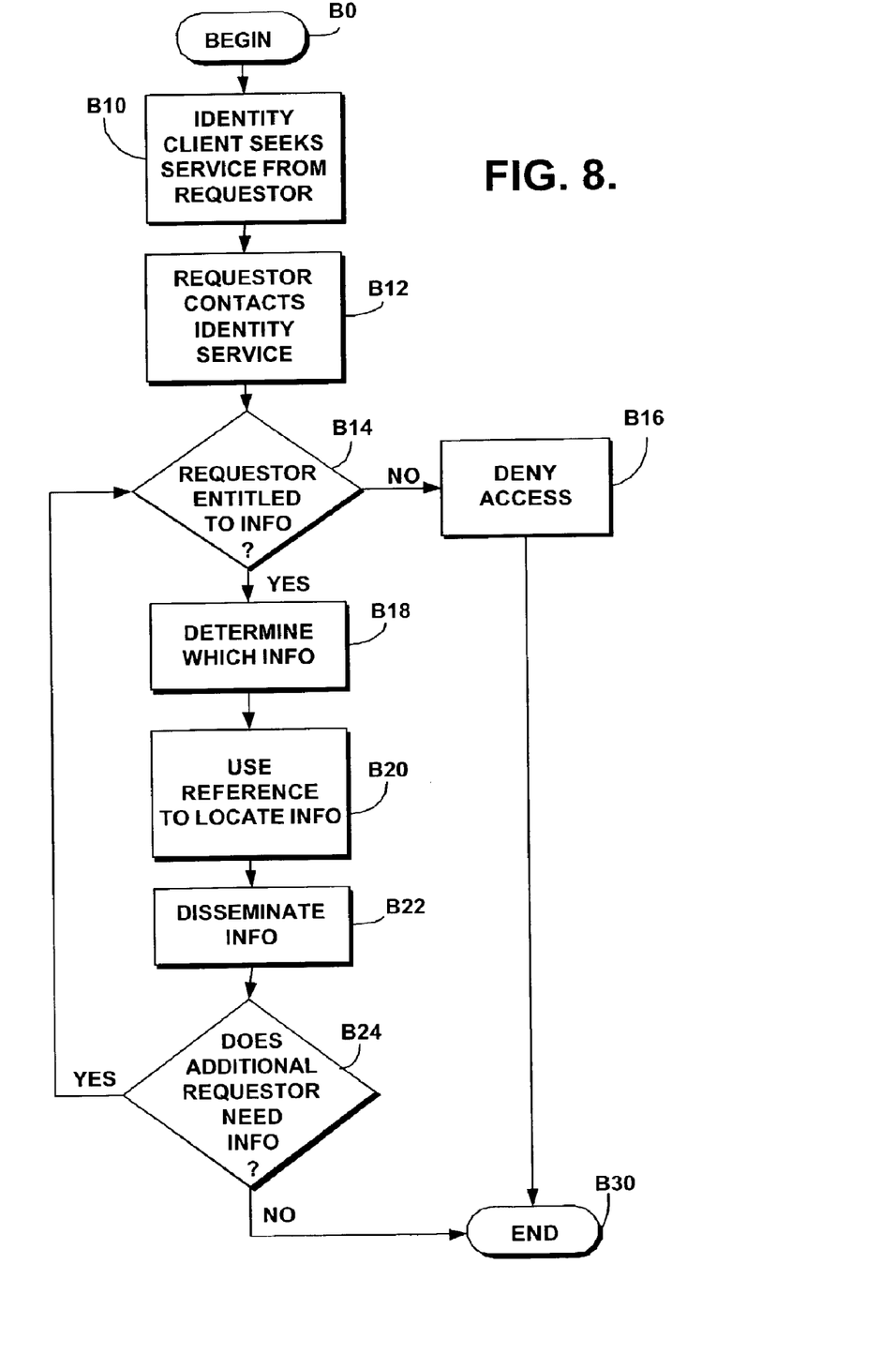
FIG. 8 is a flow chart showing steps involved in a process of distributing identity information.

FIG. 8 illustrates a process through which the identity service 10 distributes identity information to identity requesters 200 during an electronic transaction. The transaction could be any electronic transaction, such as an online purchasing transaction, an in-store credit card purchase, an in-store check purchase, or a credit card transaction over the telephone. The process begins in step B0 and in step B10, an identity client 300 seeks service from an identity requester 200. Typically, the identity client 300 would accomplish this by accessing a merchant web site or bringing an item to a store register for purchase. In step B12, the identity requester 200 contacts the identity service 10. Typically, the identity requester 200 wants to find out if the identity client 300 can pay for the proposed purchase. When contacting the identity service 10, the identity requester 200 may attach an information token or digitally watermark the transaction. Performing this function will make detection of fraudulently used or obtained information much simpler since all information would be tagged as arising from a specific transaction or through a specific identity requester 200. In other embodiments, the identity service 10, the identity client 300, or the identity insurance service 400 may perform the information token or digital watermarking function.

In step B14, the identity service 10 uses its registration tools to determine if the requester 200 is entitled to the requested information. The identity requester 200 can only be entitled to the requested information if it has registered with the identity service 10. In step B16, the identity service 10 denies access if the identity requester 200 is not registered. If the identity requester 200 is registered to receive identity information, in step B18, the identity service 10 uses its distribution logic 26 to determine which identity information is available to the identity information requester 200. For instance, a merchant requester 210 doesn't need to know the identity client's address or credit card number. The merchant requester 210 only needs to know that the identity client 300 can pay for the proposed purchase. Accordingly, in step B20, the identity service 10 uses its reference tools 24 to reference information pertinent to the identity client's payment selection. For instance, the identity service 10 uses the pointer to the client's identity information to determine whether a credit card company or credit service provider requester 220 will approve the proposed purchase. In order to determine which information an identity requester 200 should receive, the distribution logic 26 may access a "class" of requesters such as the requesters 210, 220, and 230 as described above with reference to FIG. 4. Alternatively, the distribution logic may make the determination of which information is available on a transaction-by-transaction basis.

In step B22, the identity service 10 uses its dissemination tools 28 to distribute the acquired information to the identity requester. For instance the identity service 10 may tell the identity requester 200 that the identity client 300 is able to charge the proposed amount.

In step B24, the identity service 10 determines if an additional requester needs identity information. For instance, the delivery service requester 230 may need the address to deliver the purchased item. Accordingly, the identity service 10 returns to step B14 to determine if the requester is authorized and repeats steps B16-B24 as needed until the process ends in step B30.

Figure 9:
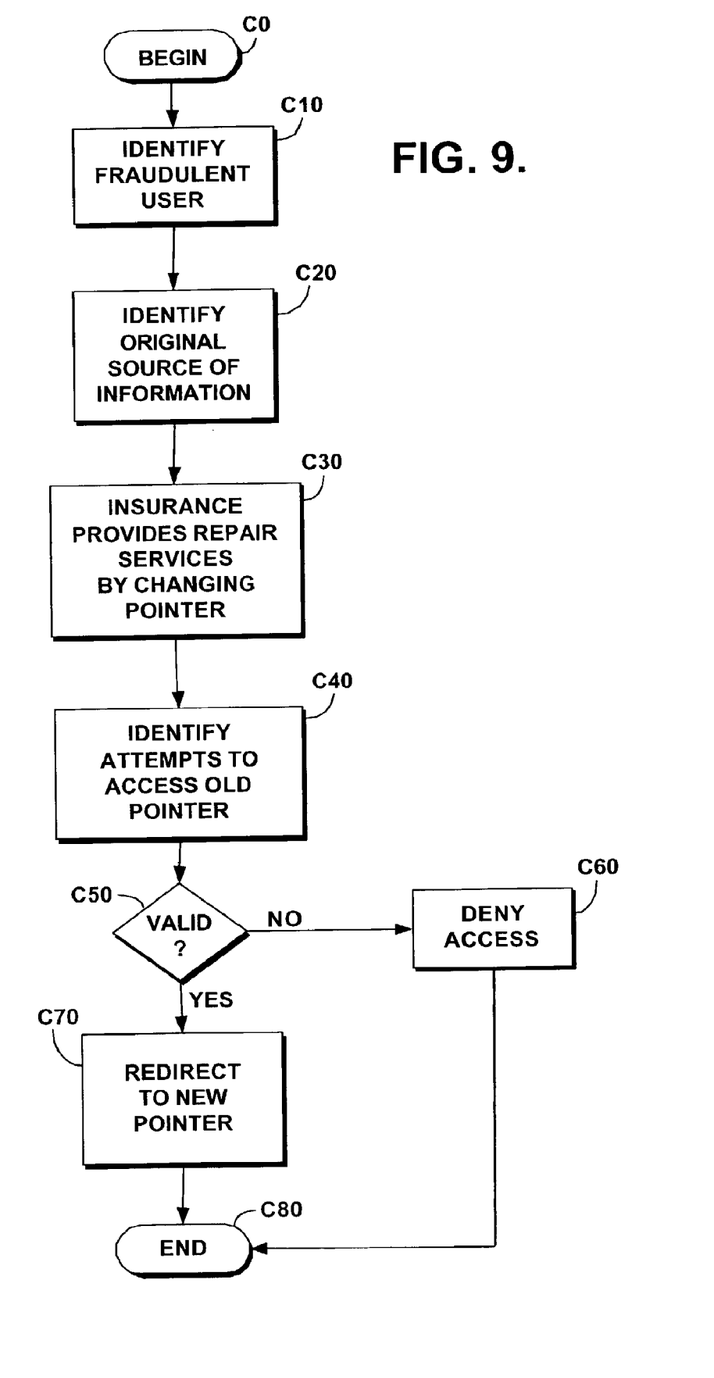
FIG. 9 is a flow chart illustrating steps involved in detecting fraudulently distributed information and repairing an identity.

FIG. 9 illustrates a process for implementing identity insurance and repair using the identity insurance service 400. The process begins at step C0, and the identification of a fraudulent use occurs in step C10. The detection step may occur through any one of the involved parties including the identity service 10, the identity insurance service 400, the identity requester 200, and the identity client 300. In step C20, the identity service 10 or the identity insurance service 400 uses the digital watermarking or attached information token to determine a source of the detected information. In step C30, the identity insurance service 400 provides repair services by replacing the original pointer to the identity information with a new pointer. In step C40, the identity insurance service 400 identifies attempts to access the old pointer. In step C50, the identity insurance service determines if these attempts to access the old pointer are valid. If they are valid, the identity insurance service 400 will redirect the attempt to the new pointer in step C70. If the attempts are not valid, the identity insurance service 400 will deny access in step C60 and the process ends in step C80.

The present invention has been described in relation to particular embodiments, which are intended in all respects to be illustrative rather than restrictive. Alternative embodiments will become apparent to those skilled in the art to which the present invention pertains without departing from its scope. For instance, although the invention is described as having an identity service 10 and an identity insurance service 400, these components could be combined into one service.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

We claim:

1. A computer-implemented method for using an identity service for protecting identity information during an electronic transaction using a computing device having processor, memory, and storage units, the computer-implemented method comprising:
   registering an identity client, wherein the identity client possesses an associated multi- component identity;
   registering an identity requestor to access personal information concerning the identity client;
   creating a unique identity pointer to reference the identity of each identity client;
   creating a new identity pointer upon detection of fraudulent activity via repair tools of an identity insurance service;
   re-directing authorized attempts and denying access to unauthorized attempts to the new identity pointer via monitoring tools; and
   regulating access to the multi-component identity such that the identity service authorizes dissemination of fewer than all components of the multi-component identity to the registered identity requestor.

2. The computer-implemented method of claim 1, wherein the new identity pointer with the identity insurance service controls access to the multi-component identity.

3. The computer-implemented method of claim 1, further comprising accessing the multi-component identity outside of the identity insurance service.

4. The computer-implemented method of claim 1, further comprising receiving an identity information request from an identity requestor participating in a retail transaction.

5. The computer-implemented method of claim 1, further comprising determining appropriate identity components by locating a requestor class.

6. The computer-implemented method of claim 5, wherein locating a requestor class comprises locating one of a merchant class, credit service provider class; or delivery service class.

7. The computer-implemented method of claim 6, wherein a component available for the merchant class is verification of sufficient funds.

8. The computer-implemented method of claim 6, wherein a component available for the credit service provider class includes a transaction amount.

9. The computer-implemented method of claim 6, wherein components available for the delivery service class include an address and phone number.

10. The computer-implemented method of claim 1, further comprising tagging distributed identity information in order to indicate origin.

11. The computer-implemented method of claim 10, further comprising providing identity repair upon detection of fraudulently distributed identity information.

12. A computer-implemented identity service for protecting identity information during an electronic transaction using a computing device having processor, memory, and storage units, the computer-implemented identity service comprising:
   registration tools stored in the memory unit for registering identity clients, identity requestors, and an identity insurance service, wherein each identity client is associated with an identity having a plurality of discrete components;
   reference tools stored in the memory unit for creating a unique identity pointer to reference the identity of each identity client via the processor unit;
   repair tools utilized by the identity insurance service to create a new identity pointer upon detection of fraudulent activity;
   monitoring tools for re-directing authorized attempts and denying access to unauthorized attempts to the new identity pointer; and
   access distribution logic stored in the memory unit for regulating access to the identity via the processor unit, such that each registered identity requestor is entitled to access fewer than all components of the identity.

13. The computer-implemented identity service of claim 12, wherein the identity information distribution logic determines the components of available information by locating a requestor class.

14. The computer-implemented identity service of claim 13, wherein the requestor class includes one of a merchant class, credit service provider class, or delivery service class.

15. The computer-implemented identity service of claim 14, wherein available identity components for the merchant class includes verification of sufficient funds, available identity components for the credit service provider class include a transaction amount, and available identity components for the delivery service class include an address and phone number.

16. The computer-implemented identity service of claim 12, further comprising identity insurance and repair mechanisms.

17. A computer-implemented system for controlling distribution of client identity information during an electronic transaction using a computing device having processor, memory, and storage units, the computer-implemented system comprising:
   identity request processing tools for processing a request for client identity information from an identity requestor via a networking environment of the computing device;
   identity information distribution logic stored in the memory unit for determining a type of client identity information available to the identity information requestor;
   reference tools stored in the memory unit for referencing the type of available client identity information;
   an identity insurance service tool to perform identity repair upon detection of fraudulently obtained identity information or upon request of an identity client; and
   identity information dissemination tools stored in the memory unit for providing the available type of identity information to the identity requestor.

18. The computer-implemented system of claim 17, wherein the reference tools comprise an identity pointer for pointing to the client identity information.

19. The computer-implemented system of claim 17, wherein the identity requestor is a participant in a retail transaction.

20. The computer-implemented system of claim 17, wherein the identity information distribution logic determines the type of available information by locating a requestor class.

21. The computer-implemented system of claim 20, wherein the requestor class includes one of a merchant class, credit service provider class, or delivery service class.

22. The computer-implemented system of claim 21, wherein available identity information for the merchant class includes verification of sufficient funds, available identity information for the credit service provider class includes a transaction amount, and available identity information for the delivery service class includes an address and phone number.

23. The computer-implemented system of claim 17, wherein the client identity information is located outside the identity service.

24. The computer-implemented system of claim 17, further comprising tagged distributed identity information to indicate origin.

25. The computer-implemented system of claim 17, wherein the identity repair of the identity insurance service tool creates a new reference to the client identity information.

26. A computer-implemented method using a computing system having processor, memory, and storage units for controlling distribution of client identity information during an electronic transaction using an identity service, the computer-implemented method comprising:
    receiving an incoming request for client identity information from an identity requestor via a networking environment of the computing system;
    determining a subset of client identity information available to the identity requestor via the processor unit;
    referencing the available subset of client identity information;
    detecting fraudulently obtained client identity information;
    creating a new reference to the client identity information via an identity insurance service tool;
    re-directing authorized attempts to the new reference; and
    disseminating only the available subset of client identity information to the identity requestor.

27. The computer-implemented method of claim 26, further comprising referencing the available subset of client identity information using an identity pointer to the identity information.

28. The computer-implemented method of claim 26, wherein the client identity information is located outside of the identity service.

29. The computer-implemented method of claim 26, further comprising receiving the identity information request from an identity requestor participating in a retail transaction.

30. The computer-implemented method of claim 26, further comprising determining a type of available information by locating a requestor class.

31. The computer-implemented method of claim 30, wherein locating a requestor class comprises locating one of a merchant class, credit service provider class, or delivery service class.

32. The computer-implemented method of claim 31, wherein available identity information for the merchant class includes verification of sufficient funds, available identity information for the credit service provider class includes a transaction amount, and available identity information for the delivery service class includes an address and phone number.

33. The computer-implemented method of claim 26, further comprising tagging distributed identity information in order to indicate origin.

34. The computer-implemented method of claim 26, further comprising providing identity repair upon detection of fraudulently distributed identity information.

* * * * *